July 7, 1959  S. R. STILES  2,894,050
ALKYLATION OF HYDROCARBONS
Filed April 5, 1957  2 Sheets-Sheet 2

INVENTOR.
SAMUEL R. STILES
BY
ATTORNEY
AGENT

United States Patent Office 2,894,050
Patented July 7, 1959

2,894,050
ALKYLATION OF HYDROCARBONS

Samuel R. Stiles, Creeskill, N.J., assignor to The M. W. Kellogg Company, Jersey City, N.J., a corporation of Delaware Application April 5, 1957, Serial No. 651,093

11 Claims. (Cl. 260—683.58)

This invention relates to an alkylation process and, more particularly, to the alkylation of isoparaffins with olefins in the presence of a liquid catalyst to produce hydrocarbon compounds boiling in the gasoline range. Still, more particularly, it relates to a method and apparatus for decreasing acid and/or catalyst ester entrainment in an alkylation process.

In the alkylation of hydrocarbons with olefins in the presence of a liquid catalyst, the problem is presented of separating the catalyst and other contaminants from the hydrocarbon reaction product. Of particular interest are the alkylation processes which involve the use of an acid or other corrosive catalyst. Typical is the alkylation of isobutane with butylene in the presence of sulfuric acid which may be illustrated, according to one school of thought, by the following reactions:

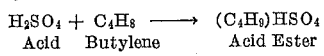
Acid   Butylene   Acid Ester

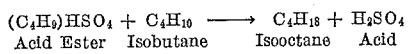
Acid Ester  Isobutane   Isooctane  Acid

As shown, sulfuric acid catalyst reacts with butylene to form butyl acid sulfate, which in turn reacts with isobutane to form isooctane, with the sulfuric acid molecule being released for further catalytic action. In the alkylation reaction, the majority of contacts between the acid, isoparaffin and olefin are followed by the illustrated condensation reaction; however, in some cases the acid ester molecule does not come in contact with an isoparaffin molecule and acid esters leave the reaction zone in the product mixture.

In addition to the above reactions, acid esters may react with olefins to form polymers and free acid or to form neutral esters, as illustrated by the following reactions:

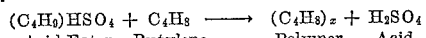
Acid Ester  Butylene   Polymer   Acid

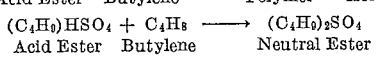
Acid Ester  Butylene   Neutral Ester

The failure of acid esters to react to form alkylate and the formation instead of olefin polymers and neutral esters results from the fact that the acid ester molecules do not contact isoparaffin molecules. Another factor which influences the production of these undesirable side-products is the high reactivity of olefins in the presence of sulfuric acid, particularly at higher temperatures. A partial control of the production of polymers and esters, both those illustrated and others of more complex molecular structure and higher molecular weight, is provided by carrying out the alkylation reaction in such a manner that a large excess of isoparaffin is always present in the reaction zone. In addition, reaction conditions of temperature, pressure, acid concentration, etc., when closely controlled, also tend to promote the alkylation reaction and diminish side reactions. In spite of these precautions, however, acid and neutral esters and polymers are present in the effluent from the alkylation reaction zone.

In the conventional alkylation process, including the illustrated example, good contact between the reactants is provided by conducting the reaction in a zone of high turbulence. More usually, the reaction is carried out by introducing the olefin reactant into an emulsion of hydrocarbon and catalyst. Although this method of operation provides good conversion and an alkylate of high quality, it also introduces the problem of separating the hydrocarbon-catalyst emulsion into alkylate product and catalyst after the alkylation reaction is completed. For this purpose, it is customary to provide a settling zone following the alkylation reaction zone wherein the mixture is allowed to separate into the desired phases. The degree of separation obtained in this zone is dependent on a number of factors, including the stability of the emulsion, the viscosity of the catalyst and hydrocarbon phases, and the settling time provided therein. Ordinarily, separation is incomplete and each phase leaving the alkylation reactor is contaminated with material which would normally be retained in the other phase. The phase of interest here is the hydrocarbon, and the contaminants retained therein comprise primarily unseparated catalyst and catalyst esters.

The presence of alkylation catalyst and catalyst esters in hydrocarbons leaving the alkylation reactor presents a number of disadvantages. In the conventional alkylation process it is customary to recycle at least a portion of the contaminated catalyst phase from the settling zone to the alkylation contactor. A loss of catalyst in the hydrocarbon effluent from the reactor means a reduction in this stream, and consequently, an increase in the amount of fresh catalyst which must be introduced into the contactor. The presence of esters in the hydrocarbon effluent also presents difficulties. In the usual alkylation process, it has been the practice to treat the reactor effluent with a neutralizing material, for example, caustic to remove esters and entrained catalyst. The treated hydrocarbon mixture is then further processed to separate unreacted feed and low-boiling hydrocarbons from the alkylate product. More usually, however, the caustic treatment is only partially successful and the contaminants which are not removed pass into the alkylation recovery system. The result is numerous instances of catalyst corrosion and of fouling, due to partial saponified esters. It has also been found that many of the esters are unstable to heat and decompose at elevated temperatures with the release of sulfur dioxide or sulfur trioxide and the formation of heavy polymer type materials. This introduces additional fouling in high temperature towers and reboilers.

The detrimental effects of catalyst and ester carry-over are not limited to the alkylation liquid recovery system. This problem may also exist in the handling of vapors leaving the reaction zone. Typical, again, is the alkylation of isobutane with butylene. This reaction is preferably carried out at low temperatures and pressures, primarily to inhibit the formation of undesirable side-products. The problem of removing sensible and reaction heat from the alkylation system is usually solved by the use of refrigeration, which involves the vaporization and removal of a large quantity of hydrocarbons from the alkylation reaction zone. The refrigeration gases normally contain entrained liquid in the form of droplets, including both acid catalyst and acid and neutral esters. Under the conditions which exist in the conventional alkylation gas refrigeration and compression system, ester decomposition is promoted with the undesirable results previously noted. Also, sulfur dioxide evolved in the decomposition, in combination with entrained acid, may provide a corrosive condition in the compressor and in the fractionation equipment associated therewith.

It is an object of this invention to provide improved process and apparatus for the alkylation of hydrocarbons in the presence of a liquid catalyst.

It is another object of this invention to improve the separation of hydrocarbon and catalyst phases in a process for the alkylation of hydrocarbons in the presence of a liquid catalyst.

Still another object of this invention is to decrease the consumption of catalyst in the alkylation of hydrocarbons.

Yet another object of this invention is to reduce corrosion and fouling in alkylation recovery and compressor equipment.

Still another object of this invention is to provide improved process and apparatus for the alkylation of isoparaffins with olefins in the presence of sulfuric acid.

These and other objects of the invention will become more apparent from the following detailed description and discussion.

In the method of this invention, the aforementioned objects are broadly achieved by passing gases and liquid effluent from an alkylation reaction zone through wire coalescer mats effective to remove, by contact, entrained liquid droplets.

This invention is applicable to alkylation processes generally, including the alkylation of paraffins, isoparaffin, aromatic compounds, cycloaliphatic compounds, alcohols, etc., with olefin hydrocarbons. The alkylation reaction takes place over a range of temperatures and pressures varying from as low as $-50°$ F. to as high as about $600°$ F., when certain aromatic compounds are reacted with olefins. It may be conveniently carried out under pressures at or below atmospheric or as high as several hundred atmospheres. To establish conditions favorable for the production of high octane alkylate in large yields, it is desirable to contact the reactants under conditions of violent agitation, yet provide uniform mixing, and to maintain at the contact point a high concentration of alkylatable hydrocarbons to olefins.

A wide variety of catalysts are available for use in the alkylation of an alkylatable compound with an olefin, or, more specifically, an isoparaffin with an olefin. Those frequently employed include acids, such as sulfuric, hydrofluoric, phosphoric, chlorosulfonic, fluorosulfonic, etc., which may be used either singly or in mixtures. Non-solid Friedel-Craft catalysts which form a liquid phase substantially immiscible with the hydrocarbon phase may be used. They include the conventional Friedel-Craft metallic halides in acid such as those just enumerated and metallic halide-hydrocarbon complexes. Other liquid catalysts which provide a heterogeneous reaction mixture with hydrocarbons may also be used within the scope of this invention.

Although the invention finds wide application, it is particularly of interest in the alkylation of low-boiling isoparaffins with olefins in the presence of sulfuric acid. This reaction is usually carried out at temperatures between about $0°$ F. and about $150°$ F. and is preferably conducted in several stages. The pressure in the reaction zone is maintained at a level sufficient to keep the reactants in a liquid state, usually between about atmospheric and about 100 p.s.i.g. In order to obtain a high quality product, it is desirable to maintain a high isoparaffin to olefin ratio in the feed to the reaction zone, preferably between about 2 and about 20 mols per mol, and it is necessary to keep the acid catalyst strength above about 80 percent and preferably above about 90 percent. A preferred method of providing the desired reactant ratio is to conduct the process in several reaction stages with series flow of the isoparaffin and catalyst through each stage and parallel flow of olefin to each stage. The time required to carry out the alkylation reaction varies with the operation conditions; however, in general, a reaction time between about 2 seconds and about 20 minutes suffices. The alkylation process is preferably conducted in the liquid phase and under conditions of agitation whereby good contact is obtained between the hydrocarbon reactants in one phase and the alkylation catalyst in the other liquid phase.

Feed stocks used in the alkylation process may vary widely in composition and may contain a large variety of saturated and unsaturated compounds. A primary source of feed materials for this reaction exists in refinery process gases which may contain paraffins having from 1 to 6 carbon atoms, isoparaffins including isobutane, isopentane and others of higher molecular weight, and numerous low-boiling olefins and their isomers, for example, propylene, butylene, isobutylene, etc. It is within the scope of this invention to use feed stocks containing these and higher boiling compounds in widely varying proportions.

The alkylation of an aromatic or a cycloaliphatic compound with an olefinic compound results in the production of compounds which may be useful in themselves, but which generally are more useful as intermediates in the manufacture of other chemical compounds. Examples of aromatic and cycloaliphatic alkylation reactions include the reaction of benzenes, naphthalenes, phenols, etc., and their homologues with olefins in the presence of mixed catalysts, for example, hydrofluoric acid-boron trifluoride or liquid complexes of aluminum chloride with acids and/or hydrocarbons. In general, these reactions are carried out between about 30 and about 120° F. under atmospheric or superatmospheric pressures, as required to maintain the reactants in a liquid state. Other typical reactions are benzene with propylene in the presence of liquid phosphoric acid, benzenes with isoparaffins in the presence of olefins, and an acid such as sulfuric or hydrofluoric, isoparaffins with alkyl substituted cyclopentanes in the presence of an acid such as sulfuric or hydrofluoric, etc. The reaction conditions used in these and similar reactions involve temperatures and pressures comparable to those illustrated. Normally, the alkylatable compounds are present in greater quantity than the olefinic reactant, and the relative concentrations of catalyst and hydrocarbon reactants, in general, conform to those required for the alkylation of isoparaffins. The pressures may vary from subatmospheric to several atmospheres, depending on the particular reactants, and the reaction time required varies from as low as a few seconds to several hours.

The olefinic reactants used in alkylating acyclic, cycloaliphatic and aromatic compounds are usually the low-boiling olefins previously mentioned; however, other more complex olefinic compounds well known to those in the art, which are capable of entering into the alkylation reactions, are also included within the scope of this invention.

In a typical application of the invention, isobutane and sulfuric acid are introduced into an alkylation reaction zone and are violently agitated to form well dispersed emulsion, this being the preferred method of assuring intimate contact between the acid catalyst and the hydrocarbon to be alkylated. The major portion of the isobutane feed is provided by a recycle stream obtained from subsequent distillation steps. Any additional quantity of isobutane required, for example, that amount needed to start up the unit, is usually supplied from an independent source. The mixing and agitation required in the alkylation contact zone may be provided in a number of ways; however, usually a conventionl mixer, or pump, provides a means for creating and moving the emulsion at high velocity and also for circulating the emulsion in the contact zone. The reaction may be carried out in one stage, although more usually several stages in series are provided with a portion of the olefin reactant being admitted to each stage and contacting isobutane passing serially through the successive stages. The alkylation feed, which contains the olefin reactant, also contains isobutane, butane, propane, isopentane, pentane, and frequently small quantities of lighter paraffins. The temperature in the reaction zone is maintained at a constant low level by vaporizing therefrom the lighter components in the reaction products, more usually, a mixture of butane, isobutane, propane and any lower boiling compounds. The vapors are compressed and condensed and the condensate, after the removal of propane and lighter components, is returned to the alkylation reaction zone in the isobutane recycle.

Effluent from the last contactor reaction section is passed to a separation zone wherein the emulsion is allowed to separate into two phases, one predominately acid in content, and the other comprising primarily hydrocarbons. To aid in the separation, particularly of the acid vapors, a coalescer mat or demister pad, referred to as a vapor-liquid coalescer, is positioned in the upper portion of the reactor. This mat or demister pad is preferably horizontally positioned and formed of material which is inert and selectively wetted by catalyst and catalyst esters. The horizontal position of the mat facilitates the removal of acid vapors due to the countercurrent flow of liquid coalesced by the mat. By suitable baffles and a drain pan the liquid separated by the horizontal coalescing mat is caused to flow into the reaction side of the contactor. Thus all the acid is caused to flow through the liquid-liquid coalescer prior to entering the separation or settling zone of the contactor and vaporous materials are precluded from passing over the hydrocarbon layer in the settling zone. Contaminated acid containing esters and hydrocarbon polymers is removed from the contactor, with a portion being recycled to the reaction sections and the remainder either being processed to remove contaminants or being used in a treating process wherein a high degree of acid purity is not required or being discarded. The material in the hydrocarbon phase comprises a mixture of alkylate, unreacted isoparaffin, normal paraffins and minor amounts of acid and ester contaminants.

The liquid droplets which are removed by the various coalescers will vary in size. The primary purpose of the coalescers is to remove droplets which are sufficiently small in size to be unaffected by Stokes Law at the flowing conditions; that is, droplets having a substantially zero settling rate under the conditions obtained in the system. These droplets usually range in size from about 0.01 micron to about 5 microns. Since the settling time normally provided following the alkylation reaction is of rather short duration, larger droplets which would settle under conditions of extended time may also be entrained. These may range in size up to about 10 microns or larger. The removal of these droplets is also contemplated within the scope of the invention.

In their preferred construction, the coalescer mats are formed of wires arranged so as to present a large surface for impingement of flowing droplets. The wires used may vary in size, ranging from about 0.001 inch in diameter to as large as about 0.1 inch in diameter. If desired, more than one size of wire may be used in an individual mat, although, more usually, all the wires are of a single size. Since pressure is an important factor in the alkylation process, the wires are preferably arranged to present a minimum obstruction to flow. More usually, the spacing of the wires and the wire size are proportioned to provide a minimum pressure drop. For example, when coalescing in a mat having a thickness or depth between about 4 and about 6 inches and a liquid throughput of between about 0.1 and about 0.4 cubic feet per second per square foot of mat surface, the pressure drop therethrough is between about 0.1 and about 0.5 p.s.i.g. In one embodiment of the invention, maximum contact surface with a minimum of pressure drop is obtained by arranging the wire in the coalescer in the form of screens of rather wide mesh with successive screens being sufficiently displaced laterally to provide a minimum of open area in the longitudinal direction of flow and at the same time displaced sufficiently longitudinally to present a minimum obstruction to lateral flow. In such a mat, each particle of the liquid has a large angular component of flow relative to its linear movement, and thus follows a winding course through the mat.

The thickness of the mat varies with the service and degree of the droplet removal desired; more usually, in commercial operations the coalescing material comprises between about 40 and about 200 wire screens and has an overall thickness of between about 4 and about 6 inches, thus providing good contact by depth. If the effective surface of the mat is considered as equal to one-half of the total wire surface, then for each inch of depth the coalescer usually furnishes a contact surface area of between about 0.5 and about 20 square inches per square foot of mat surface, thereby providing a surface to volume ratio of between about 6 and about 240 to 1. The mats may be manufactured in any suitable shape for satisfactory installation in processing equipment. For example, in some instances it may be desirable to use a mat in the form of a roll for installation in a cylindrical vessel, whereas in other cases a square shaped mat or one of irregular shape may be desirable. As stated previously, coalescer mats are preferably constructed with a wire of one size for each individual mat; however, in some cases it may be desirable to form a coalescer of a number of successive mats, each providing different flow characteristics therethrough, namely, by the use of wires of different sizes.

The material from which the mat is constructed comprises various materials, which, as mentioned before, are selectively wetted in the alkylation system by the alkylation catalysts and esters thereof. These materials include stainless steels, plastics, such as, for example, polytrifluorochloroethylene and polyethylene, glass cloth, glass wool, etc. In addition to the wetting ability required, it is also desirable that the materials used be relatively non-corrosive in the alkylation system and have a sufficient degree of strength to withstand normal operating stresses. For the latter reason, more usually it is preferred to use a metal selected from the group given.

A number of interesting phenomena have been noted in the use of coalescer mats of the type described. For example, it has been found that the superficial linear velocity of the fluid flowing through the mat has a considerable effect on the size of the liquid particles coalesced with droplets of decreasing size being removed as the velocity through the mat is increased. For example, at low liquid velocities, that is, velocities ranging from between about 0.2 and about 0.5 feet per second, the larger droplets, down to those of about 2 microns in sizing, are effectively removed. At higher velocities, up to about 0.7 feet per second, the smaller droplets, including those of about 0.5 micron, are preferentially removed. Similar results obtain in the separation of liquid droplets from a vapor medium. In the case of a vapor system, however, the corresponding vapor velocities range from between about 5 and about 10 feet per second to remove larger droplets, and up to about 15 feet per second to remove droplets of about 0.5 micron in size. Because of the aforedescribed velocity effect, it has been found advantageous, where emulsion passes first through a low velocity section and then a higher velocity section, to install a coalescing mat in each section. Inasmuch as removal of entrained particles is not 100 percent effective in any coalescer, it is apparent that this type of installation has a definite advantage.

At superficial velocities, higher than those given, the degree of entrained liquid removal usually decreases, presumably due to splitting up of at least a portion of the entrained liquid droplets into very small droplets which successfully pass through the coalescer mat. As the velocity is increased still further, the coalescing becomes poorer until eventually substantially no droplets are removed. This situation usually obtains at a velocity between about 0.6 and about 0.8 feet per second in a liquid system and at between about 13 and about 17 feet per second in a vapor system. It has been found unexpectedly, however, that if a mat operating within the satisfactory coalescing range, namely, between about 0.2 and about 0.7 feet per second or between about 5 and about 15 feet per second, in liquid and vapor systems respectively, is installed after such a high velocity mat, the total removal of entrained liquid particles is substantially increased. The reason for this phenomena is not clearly understood. According to one theory, some of the smaller droplets, which would not normally be removable at coalescing velocities, combine or coalesce with other droplets during their passage through the high velocity mat. This, in effect, increases the percentage of removable droplets which can then be taken out in a subsequent mat operating within the coalescing velocity range. As used subsequently herein, the term "high velocity" is considered to include generally velocities above the critical coalescing velocity. As used herein, the term "critical coalescing velocity" is considered to be the velocity above which coalescing decreases rather than increases, that is, the upper limit of the coalescing velocity range.

As an alternate to the two mat vapor system described, it may be desirable to use three mats, namely, by the addition of a high velocity mat preceding the coalescing mat. More usually, in an installation comprising a high velocity mat followed by one operating within the effective coalescing velocity range, it is desirable to maintain a velocity through the first mat above about 20 feet per second and not less than about 15 feet per second. It should be clearly understood that the use of two or more mats having different fluid velocities therethrough does not provide a result which is merely cumulative in nature. Thus, the use of systems as described provides substantially greater droplet removal than would be obtained by installing successive mats in a zone of constant velocity.

More than one method of attaining variations in velocity through the mats is available. For example, if mats of identical construction are used, it is possible to vary the velocity therethrough by varying the cross-sectional area of the mat exposed to flow. On the other hand, a similar effect may be obtained by the use of successive mats having a different permeability to flow. This may, of course, be obtained by varying the wire size, the mesh of each individual screen forming the mat and/or the longitudinal or horizontal displacement of the screens within the mat. A particularly effective method of coalescing is provided by the use of a series of layers or beds of coalescing material offering different restrictions to flow, such as glass fiber mats with open mesh of knitted wires and glass combination.

In order to more clearly illustrate the invention and provide a better understanding thereof, reference is had to the accompanying drawings of which:

Figure 1:
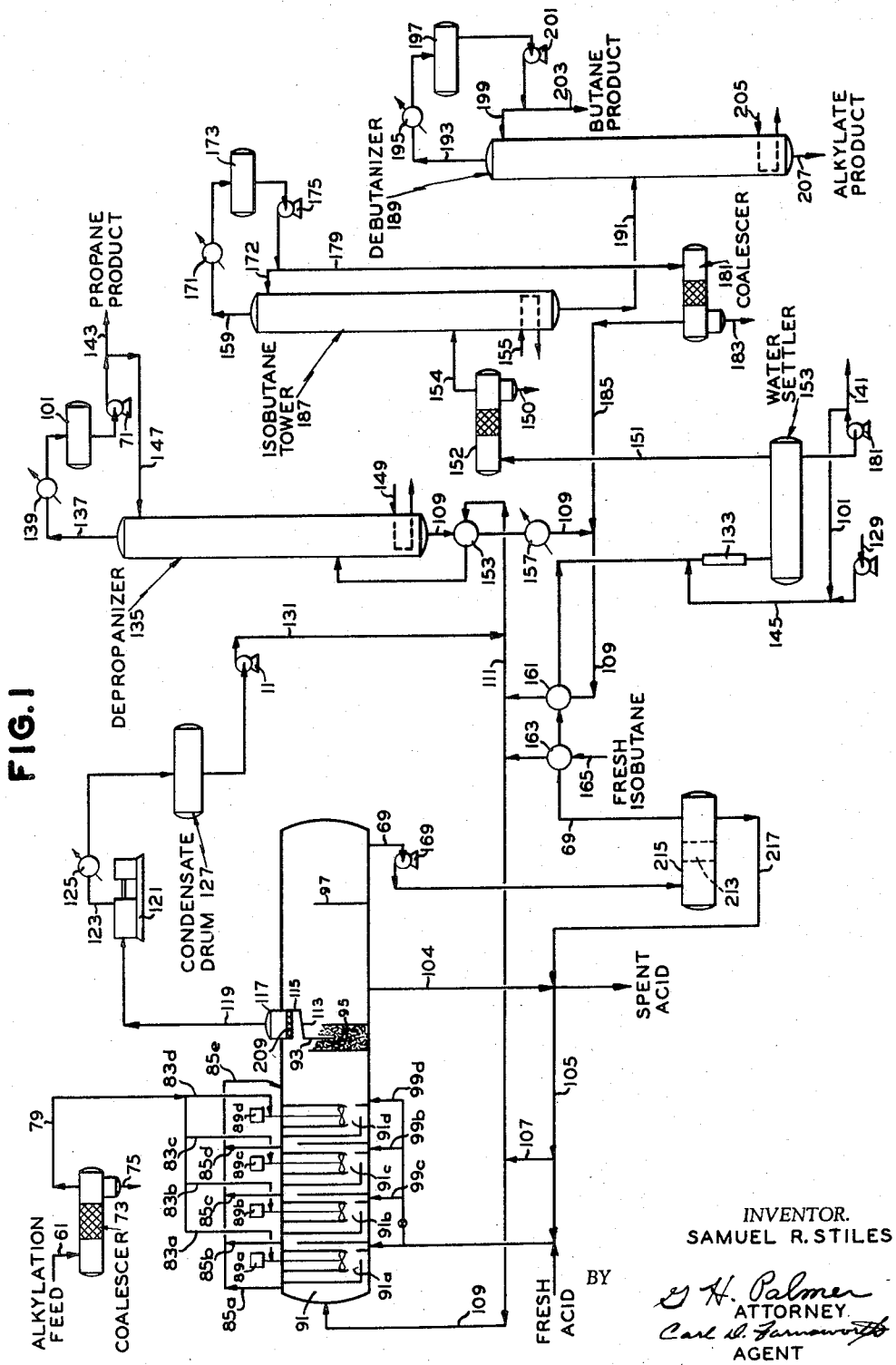
Figure 1 is a diagrammatic illustration in elevation of the process and apparatus of the present invention.

Referring to Figure 1, the alkylation reactions are carried out in a cylindrical elongated contacting vessel 71. The interior of approximately one-half of the contactor is divided into a number of separate reaction stages or sections 91a, b, c and d by transverse baffles so arranged that liquid entering the end of the contactor passes from an inlet chamber 91 upward through the first section 91a, over a baffle down to the bottom of the second 91b, then upward through the second section over a second baffle and in a similar manner through the third and fourth sections 91c and d. Each section contains a mixer 89a, b, c, and d, respectively, in this specific illustration, centrifugal submersible pumps disposed vertically with the drivers located outside and above the contactor and the impellers located in the lower portion of each reaction section. Each pump is so constructed that material entering the suction side is forced upwardly within the pump casing and then downwardly and out through perforations in the casing into the upper part of the corresponding reaction section. The pump capacities are such that the quantity of material circulated through each pump is about thirty to forty times greater than the total liquid flow entering the section within which the pump is located.

The alkylation reactants and catalyst enter the contactor 71 at three different points. The treated alkylation feed, comprising a mixture of propane, butane, isobutane and butylene is passed through conduit 61 into coalescer vessel 73 containing excelsior or suitable coalescing material for the removal of undissolved water. The water is removed from the coalescer through conduit 75 and the alkylation feed substantially free of entrained water passes overhead through conduit 97 and enters pumps 89a, b, c and d through conduits 83a, b, c and d respectively, passes downward through a hollow sleeve surrounding each pump shaft and is admitted to the liquid stream flowing through each pump, downstream of the pump impellers. A mixture of propane, butane and isobutane made up of a recycle stream from the isobutane tower 187, fresh isobutane from conduit 165 and compressor effluent from condensate drums 127 are admitted to the inlet chamber 91 of the contactor. The acid catalyst, comprising a mixture of fresh acid and contaminated acid in an amount to provide an external acid to olefin ratio of about 4 pounds of acid per pound of olefin, is admitted to the bottom of the first reaction section 91a through conduit 103. As illustrated, fresh acid alone may be used rather than a mixture of fresh and contaminated acid and acid may be introduced not only into the bottom of the first section, but may also be admitted to succeeding sections. The isobutane passes from the inlet chamber 91 also into the first section 91a, is combined with the acid and the mixture enters the suction of pump 89a, where it is picked up, emulsified, and directed within the pump casing at a high velocity. The alkylation feed from conduit 83a is admitted to the emulsion downstream of the pump impeller and the alkylation reaction proceeds immediately and is substantially completed before the reactants leave the pump casing. The capacity of pump 89a and the other pumps is sufficiently great to assure a circulation rate several times as great as the flow of alkylation feed, isobutane and acid into section 91a. Thus, unreacted isobutane is recirculated along with the acid catalyst and a portion of the alkylation product through the pump a number of times before it passes into the next section where another portion is reacted with fresh alkylation feed. The same procedure is repeated in sections 91c and d. By this method of contacting the reactants and catalyst, it is possible to provide an internal ratio of isobutane to butylene of about 450 to 1 with an external ratio of only about 15 to 1.

The mixture of isobutane alkylate and acid leaving the last section passes through a packed zone 95 formed by parallel transverse baffles, the baffle on the reaction side being solid which acts as a weir over which the liquid must flow while the baffle on the separator side is perforated such as a grid. Conventional inert packing material, such as, for example, crushed refractory material from about ½ inch to about 1 inch in diameter, Berl saddles or Raschig rings, is generally employed as packing between the baffles. Wire coalescing mats with or without glass fiber mats may also be employed in zone 95 in place of the Berl saddles, Raschig rings or other inert packing. All of the liquid alkylation effluent from the last section is forced to flow through this zone by a liquid impervious deflector baffle 93 extending from within the packing to above the liquid level in the contactor and connected to baffle pan 113. Subsequent to the packed zone, the alkylate and acid enter a settling zone defined by coalescing zone 95 and baffle 97 wherein settling time is provided for the separation of the acid and hydrocarbon phases. Generally a settling time of from about 2 minutes to about 50 minutes is provided, preferably from about 5 minutes to about 15 minutes. Alkylate which accumulates along with other hydrocarbons in the upper phase overflows baffle or weir 97 and is removed from the surge zone defined by baffle 97 and the end of the contactor through conduit 69. Contaminated acid forming the lower phase of the settling zone and containing polymers and other impurities is removed from the contactor 71 through conduit 104. A portion of this acid is recycled to the contactor or through conduit 105 or with recycle isobutane through conduit 107. The remainder of the acid is discarded or is reconcentrated and purified for use again in the alkylation reaction.

Disposed within the upper portion of the contactor, generally above the liquid coalescing zone 95, is positioned a horizontally disposed coalescing mat or demister pad which forms the lower portion of a dry drum or separation zone designated 117. The coalescing mat or demister pad is so positioned and separated by suitable vapors impervious baffles 113 and 115 connected to baffle 93 as to provide flow of all the vapors in the upper portion of the contactor through the demister pad without the vapors passing over the hydrocarbon layer in the settling zone. Baffle 113 connected to transverse baffles 93 and 115 is a downwardly sloping transverse baffle or pan for returning coalesced liquid from demister pad 209 to the reaction side of baffle 93 in the contactor. Thus recovered acid must pass through the liquid coalescing zone 95 prior to entering the settling zone of the contactor. By this method of treating, the vapors are precluded from condensing in the upper portion of the contactor and dropping into the hydrocarbon layer in the separation zone. By preventing this condensation and dropping of acid contaminants, a hydrocarbon layer is recovered from the settling zone of the contactor substantially free of acid contaminants.

The coalescing mat or demister pad 209 horizontally positioned in the upper portion of the contactor usually consists of knitted stainless steel wire having a diameter of about 0.011 inch although other suitable materials may be employed as hereinbefore described. To provide support for the mat, steel gratings or foraminous partitions horizontally positioned are provided in the lower portion of zone 117 with the coalescing mats therebetween. The velocity of the vapors leaving the contactor may be in the range of from about .02 feet per second to about 6 feet per second. Accordingly, the mat is sized to provide sufficient coalescing effect to remove substantially all entrained acid and ester droplets. Generally, the mat will be from about 3 inches to about 6 inches thick.

The alkylation contactor 71 is maintained at a temperature of about 35° F. and at a pressure of about 3.5 p.s.i.g. The alkylation reaction is highly exothermic and it is necessary to provide a method of cooling the contactor to remove the heat of reaction and the sensible heat in the feed streams and thereby maintain the reaction sections at this low temperature. In this specific illustration, the cooling is accomplished by autorefrigeration of the reactants and reaction products. In carrying out this process vapors are withdrawn from zone 117 of the contactor and passed by conduit 119 to compressor 121.

The dry gas separated from zone 117 enters the suction side of compressor 121 through conduit 119, is compressed, discharged through conduit 123, condensed in a conventional water cooler 125 and passed to a condensate drum 127. The condensate comprises a mixture of propane, butane and isobutane. It is withdrawn from the condensate drum and divided into two parts, with a portion being sent to the depropanizer 135 and the remainder being returned to the contactor 71 with fresh isobutane and isobutane recycle. It is desirable to proportion the condensed compressor effluent stream so as to maintain a controlled concentration of light materials in the contactor. By this means, it is possible to obtain the desired contactor temperature with a reasonable compressor suction pressure.

The isobutane recycle stream enters the contactor as liquid and at a higher temperature and pressure than that maintained within the contactor, i.e., about 50° F. and about 20 p.s.i.g. As a result, a portion of this stream flashes in the entrance chamber 91. To prevent a mixture of vapor and liquid from passing into the suction of pump 89a, an outlet for this gaseous material is provided through conduit 85a. A similar situation prevails in each of the reaction sections. In order to remove the reaction heat from each section, it is necessary that a further amount of light material be vaporized therein. This material is supplied primarily in the alkylation feed from conduits 83a, b, c and d, which feed is also introduced at a temperature and pressure about 50° F. and about 25 p.s.i.g., substantially higher than those maintained in the contactor. The vapors so formed are removed from the reaction sections of the contactor by conduits 85a, b, c and d, combined and returned to the contactor by conduit 85e for removal of vapors through the demister pad 209, as previously described. By this method of operation, it is possible to maintain a relatively constant temperature throughout the contactor 71.

The condensed compressor effluent from condensate drum 127 passes through pump 11 and is discharged through conduit 131 with a portion being separated through conduit 111 and joining the isobutane recycle through conduit 109, as previously described, and the remainder passing through a heat exchanger 153 countercurrent to the depropanizer bottoms and then into the depropanizer 135. Propane is taken overhead from the depropanizer through conduit 137, condensed in a conventional condenser 139 and discharged into accumulator 101. Accumulator liquid is then passed to the pump 71, from thence a portion is sent to the depropanizer as reflux through the conduit 147 and the remainder leaves the unit through conduit 143 as propane product. Heat is supplied to the depropanizer by a conventional reboiler 149 or other conventional heat source. The bottoms comprising primarily isobutane with some butane pass from the bottom of the depropanizer through conduit 109, give up a portion of their heat in exchanger 153 to the depropanizer feed and pass through a conventional water cooler 157 where the temperature is lowered still further. The cool isobutane is exchanged still again in exchanger 161 with cold effluent from the contactor 71, then is combined with fresh isobutane from conduit 165 which is also exchanged with contactor effluent in exchanger 163 and the combined isobutane stream is admitted to the reactor as previously described.

The alkylation product and unreacted alkylation feed, after separation from the spent acid in contactor 71, are removed therefrom through conduit 69 and pump 169 and introduced into vessel 215. Within this vessel there is installed still another coalescer bed 213, in this instance comprising alternate sections of coalescing material offering substantially different restrictions to flow. In this specific illustration, the bed is made up of four 4-inch sections of wire similar to that used in coalescer 209 alternated with three 2-inch sections of glass wool. Within coalescer 215, which may be referred to as an acid coalescer, additional acid contaminants found in the hydrocarbon effluent are removed and withdrawn by conduit 217. The acid in conduit 217 may be combined with the acid in conduit 104 for recycle to the contactor as hereinbefore described. The contactor effluent is then passed through exchangers 163 and 161, absorbing heat from fresh isobutane and from recycle isobutane respectively. The warmer hydrocarbon mixture is combined with water discharged from pump 129 through conduit 145 to wash any residual contaminants still remaining therein, and the combined stream passes through a mixer valve 133 into a water settler 153. Generally, the water wash is effected at elevated temperatures of from about 100° F. to about 190° F., preferably from about 130° F. to about 150° F., employing from about 15 volumes to about 25 volumes of water per 100 volumes of hydrocarbon. The combined mixture of water and hydrocarbon is passed through a suitable mixing device 133, such as a mixing valve operated with a pressure drop of from about 15 to about 25 pounds to provide for intimate contact between the water and hydrocarbon stream and then to settler 153 at a temperature of from about 100° F. to about 160° F. Contaminated water is removed from the settler by pump 81, a portion being recycled to the mixer 133 through conduit 101 and the remainder being discharged from the unit through conduit 141. The acid free effluent is passed by conduit 151 to a water coalescer 152. Coalescer 152 is similar in design to coalescer 215. In coalescer 152 water is separated from the hydrocarbon effluent and removed by conduit 150. The purified hydrocarbon effluent stream recovered from coalescer 152 is then passed by conduit 154 to isobutane tower 187 operated at an overhead temperature of about 120° F. to 125° F. and a bottom temperature of about 180° F. to 325° F., depending on the relative proportion of butane to alkylate in the net reactor products (exclusive of isobutane recycle) and a pressure of from about 100 p.s.i.g. to about 120 p.s.i.g. In tower 187, isobutane is removed overhead through conduit 159, condensed in condenser 171 and collected in accumulator 173. A portion of the condensed material is returned through pump 175 and conduit 172 to the isobutane tower as reflux. The remainder is discharged through conduit 179, passes through a water coalescer 181 similar in design to coalescer 73 and is combined through conduit 185 with the depropanizer bottoms. Water separated from this stream is removed from the coalescer through conduit 183. The heat required to vaporize the isobutane in tower 187 is supplied by conventional reboiler 155. The bottoms from the isobutane tower comprising a mixture of butane and alkylate pass through conduit 191 to a debutanizer 189 also heated by a conventional reboiler 205. Debutanizer 189 is operated at a temperature in the range of from about 100° F. to about 350° F. and a pressure of from about 40 p.s.i.g. to about 80 p.s.i.g. Butane vapor is removed overhead through conduit 193, is condensed in condenser 195 and passes into accumulator 197. Debutanizer recycle is provided from accumulator liquid discharged from pump 201 through conduit 199. The remainder of the condensed overhead is discharged through conduit 203 as butane product. The debutanizer bottoms comprising alkylate leaves the debutanizer through conduit 207 and is passed to a rerun tower (not shown) for separation into a light alkylate fraction and a heavy alkylate fraction. The rerun tower is operated at a temperature in the range of from about 100° F. to about 425° F. and a pressure above atmospheric usually from about atmospheric to about 15 p.s.i.g.

The preceding specific embodiment of the invention has been illustrated and described in conjunction with a particular alkylation process. This is not, however, intended in any limiting sense, and other flow conditions, apparatus arrangement and processing methods well known to those skilled in the art are also within the scope of the invention. Although specific coalescer arrangements are shown in the illustration, various other arrangements utilizing the concepts disclosed in the discussion of the invention may also be employed.

Figures 2, 3, 4 and 5 illustrate various construction features of typical coalescing mats.

Figure 2:
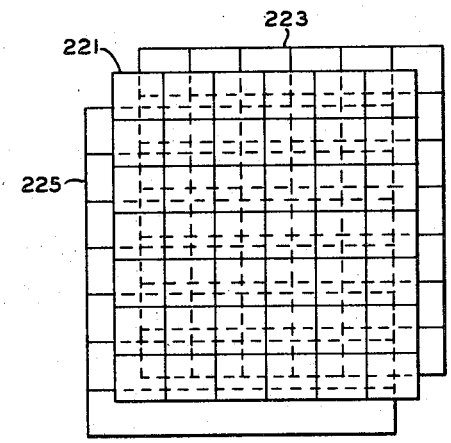
Figures 2, 3, 4 and 5 show various construction features of typical coalescing mats.
Figure 3:
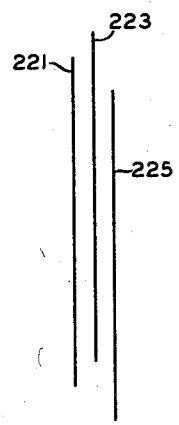

Figure 2 illustrates part of a mat which is made up of a number of flat wire screens of identical construction. Considering screen 221 as the first screen, the following screen 223 is displaced therefrom upward and to the right about one-half of the average distance between the wires which form screen 221, that is a displacement of about one-half of the mesh size of screen 221. The next screen 225, is displaced from screen 221 downward about three-quarters of a mesh and to the left about one-half of a mesh. Relative to screen 223, this screen is displaced downward about one and one-quarter mesh and to the left about one mesh. This method of laterally displacing the screens relative to each other makes it possible to provide a mat having a very large coalescing contact surface and produce almost complete obstruction to flow in the direction perpendicular to the mat, that is, in the longitudinal direction of flow with minimum pressure drop.

Appropriate means may be provided for separating and supporting the screens to maintain the lateral and longitudinal displacements required. As stated previously, the wires used in constructing the screens which comprises the coalescing mat may vary in size between about 0.001 inch in diameter and about 0.1 inch in diameter. The factors of mesh size and lateral and longitudinal displacement between screens in a particular coalescing mat are dependent to a great extent on the size of wire used. More usually, the screen mesh varies from between about 5 wire diameters to about 50 wire diameters and the displacement, both lateral and longitudinal, between successive screens varies between about 3 wire diameters and about 30 wire diameters. In this specific illustration of Figure 3, the wire is stainless steel having a diameter of about 0.011 inch and the mat is composed of screens having a mesh of about 10 wire diameters, with a radical and longitudinal displacement between screens of about 3 wire diameters.

Figure 4:
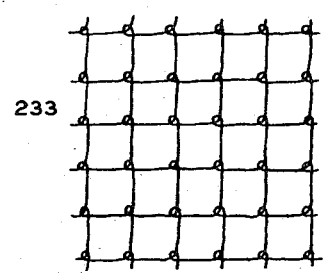

Figure 4 illustrates another variation in coalescer mat construction. In this mat the wire screens are crimped and are suitably separated from each other in a longitudinal direction by radially displacing alternate screens about 90 degrees. In this manner, the matching valleys and hills are at right angles to each other and adjacent screens are in contact with each other at the point of contact of alternating valleys and hills. In order to allow maximum flow and provide a large coalescing surface with a minimum of pressure drop, the screens are, in addition, displaced laterally similar to the screens in Figure 3. In addition to separating the screens, whereby no spacing means is required, crimping also imparts mechanical strength to the mat. The mesh size and lateral and longitudinal displacement provided in a mat of this type are preferably of the same order of magnitude as those given for the mat of Figures 2 and 3.

Figure 5:
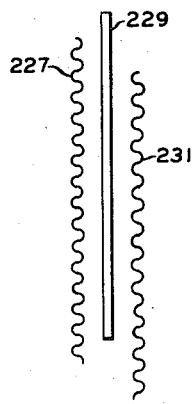

Figure 5 presents another construction feature in which the screens which comprise the mat are made up of knitted wire. In a mat of this type, the openings in each screen are sufficiently irregular to reduce the necessity for lateral displacement between the screens, particularly when longitudinal displacement is provided by crimping the screens, as in Figure 4. It may be desirable with this type of screen, as well as with that shown in Figure 4, to crimp more than one screen together to provide screens of double, triple and greater thickness and thereby impart a higher degree of mechanical strength to the mat.

The following data is presented to illustrate a typical commercial application of the invention.

*Example*

Fouling troubles in the fractionation equipment at a commercial alkylation unit became quite excessive due to high production rates of low quality alkylate. Fouling resulted primarily from excessive carryover of esters and acids in the liquid reactor effluent. The caustic and water wash equipment provided for the purpose of removing such esters was not able to cope with this condition and, as a result, a solid deposit of partially saponified esters were found on the trays in the deisobutanizer tower. This deposit was serious enough to require shutting down of the unit and cleaning the tower every 14 to 21 days.

To remedy this situation, a horizontal coalescer mat or demister pad was provided in the upper part of the contactor through which the vapors were withdrawn. The demister pad was so arranged and baffled to prevent the vapors from passing over the separation zone of the contactor in direct contact with the hydrocarbon layer. By placing the pad horizontally, the pad formed the lower portion of a zone which may be considered the dry drum and by virtue of the countercurrent flow of the coalesced liquid to the vapor flow a highly efficient coalescing pad was provided for coalescing and removing acid and ester vapors. The pad was about 20 inches by 40 inches opening and about 6 inches thick. The pad was formed of stainless steel wire (0.011 inch in diameter) with the screen suitably crimped to provide suitable longitudinal and lateral displacement between the screens. When operating the contactor without the vapor demister pad, about 24 gallons of acid per day were recovered from the hydrocarbon layer in the acid coalescer identified as coalescer 215. However, when employing the vapor demister pad as described herein, about one quart per day of acid was recovered from the acid coalescer 215. This significant improvement in acid recovery from the process which facilitated the recovery of a substantially acid-free hydrocarbon layer amounted to considerable savings in operation of the alkylation process since a greater amount of acid was recovered which could be recycled to the alkylation reactor and the caustic wash step could be eliminated. Furthermore, the substantially complete and effective removal of the heat decomposable acid and ester contaminants in the hydrocarbon effluent with the water wash eliminated fouling of reboilers employed in the recovery equipment which heretofore had to be periodically replaced, thus necessitating shutdown of the process which was both inefficient and costly.

The previous discussion relating to the use of coalescing mats has been directed primarily to the removal of acids and esters from the product of an alkylation reaction. However, the invention also includes within its scope the treatment generally of oils contaminated with acids, more usually, sulfuric acid and esters thereof. These oils may include gasoline, naphtha, kerosene, heating oils, lubricating oils, etc., which have been previously treated with sulfuric acid, or they may include reaction products, such as, for example, the product of a polymerization reaction in the presence of sulfuric acid.

Various pumps, coolers, separators, valves and auxiliary equipment have been eliminated from the drawing as a matter of convenience and clarity and their use will become apparent to those skilled in the art. Various alterations and modifications of the present invention will become apparent to those skilled in the art without departing from the scope of this invention.

Having described my invention, I claim:

1. An improved method for effecting the alkylation of olefins with isoparaffins in the presence of a liquid acid catalyst to produce an alkylation effluent substantially free of entrained acids and esters and recovery of said alkylation effluent, which comprises contacting said olefins with said isoparaffins in a contacting zone in the presence of a liquid acid catalyst under conditions to vaporize a portion of said hydrocarbon reactants, acid and esters formed during said reaction to produce a liquid alkylation hydrocarbon product mixture containing hydrocarbon, acid and esters, separating said liquid hydrocarbon from said acid and esters by passing the same through a liquid coalescing zone to effect stratification of said liquid in a settling zone into a hydrocarbon layer and a layer containing said acids and esters, withdrawing said vaporized material from the upper portion of said contacting zone and passing the same through a vapor-liquid coalescing zone, said vapor-liquid coalescing zone adapted to prevent flow of vapors over said hydrocarbon layer in said settling zone, withdrawing coalesced acids and esters from said vapor coalescing zone and passing the same to said liquid entering said liquid coalescing zone and recovering said hydrocarbon layer from said settling zone substantially free of entrained acids and esters.

2. In a process for reacting an olefin with an isoparaffin in the presence of a liquid acid catalyst in an alkylation zone wherein an alkylation product mixture is obtained comprising vapor and liquid reactant, acid, esters and alkylated hydrocarbons, the improvement for recovering hydrocarbons from said alkylation zone substantially free of entrained acid and esters, which comprises passing said liquid mixture through a liquid-liquid coalescing zone, passing said coalesced liquid mixture to a settling zone to effect stratification therein into an upper hydrocarbon layer and a lower acid and ester layer, passing said vaporous mixture through a vapor-liquid coalescing zone to recover entrained acids and esters as a liquid, passing said recovered liquid from said vapor-liquid coalescing zone to said liquid mixture passing through said liquid-liquid coalescing zone, said vapor-liquid coalescing zone adapted to prevent flow of said vapor mixture over said hydrocarbon layer in said settling zone and recovering vaporous and liquid hydrocarbons from said alkylation zone substantially free of entrained acids and esters.

3. An improved method for effecting the alkylation of an olefin with an isoparaffin and the separation of the products of reaction which comprises contacting said olefins with said isoparaffins in the presence of a liquid-acid catalyst in a reaction zone of a contacting zone under alkylating conditions to produce a liquid product comprising alkylated hydrocarbons, acids and esters and a vaporous mixture comprising hydrocarbons, acid and ester vapors, withdrawing said vaporous mixture through a vapor-liquid coalescing zone in the upper portion of said contacting zone, recovering coalesced acids and esters as a liquid from said vapor-liquid coalescing zone and combining the same with said liquid product, passing said liquid product through a liquid-liquid coalescing zone to a settling zone under conditions to effect stratification of said liquid product into a hydrocarbon layer substantially free of acid and an acid layer, withdrawing a portion of said acid layer from said settling zone and recycling the same to said reaction zone and withdrawing said hydrocarbon layer substantially free of entrained acids and esters from said settling zone for further separation into desired alkylation products.

4. In an alkylation zone containing a reaction section and a product separation section and wherein an olefin is contacted with an isoparaffin in the presence of a liquid-acid catalyst in said reaction section to produce a liquid alkylation product containing hydrocarbons, acid and esters which are stratified in said separation section into a hydrocarbon layer and an acid layer and wherein a portion of the reactants and products of reaction are vaporized in said alkylation zone, the improvement for preventing condensation of said vaporous materials and admixing with the hydrocarbon layer in said separation section which comprises separating said vaporous mixture in said reaction section into a vaporous hydrocarbon stream and a liquid acid-ester stream in a zone adapted to prevent flow of said vapors over said hydrocarbon layer in said separation section, recovering said vaporous hydrocarbon stream, recovering said liquid acid-ester stream, combining said liquid acid-ester stream with said liquid alkylation product, passing said liquid alkylation product through a liquid-liquid coalescing zone to said separation zone to effect stratification into a hydrocarbon layer and an acid layer, recovering acid from said separation section and recovering a hydrocarbon layer from said separation section substantially free of entrained acids and esters for further separation into desired alkylation products.

5. An alkylation process which comprises contacting an olefin with an isoparaffin in the presence of a liquid-acid catalyst in an alkylation zone under conditions to effect vaporization of a portion of said reactants and produce a liquid alkylate product containing alkylated hydrocarbon, acids and esters, passing said vaporous portion to a separation zone to effect separation therein into a vaporous hydrocarbon fraction and a liquid fraction containing acids, recovering said vaporized hydrocarbons, combining said liquid fraction containing acids with said liquid alkylate product, separating said liquid alkylate product in a separating zone by settling into an acid-ester layer and a hydrocarbon layer substantially free of entrained acid and esters, removing said acid-ester layer from said separating zone, removing said hydrocarbon layer from said separating zone, passing said hydrocarbon layer from said separating zone to an acid coalescer zone to effect removal of additional amounts of acids and esters contained in said hydrocarbon layer, separating a more pure hydrocarbon stream from said acid coalescer, water washing said hydrocarbon stream separated from said acid coalescer at a temperature above 100° F., separating a hydrocarbon stream from said water wash and passing the same to a water coalescer zone, removing water from said hydrocarbon in said water coalescer zone, recovering hydrocarbon from said water coalescer zone and separating said hydrocarbon into desired alkylate product.

6. An apparatus comprising in combination an elongated horizontally disposed alkylation reactor, a plurality of vertically disposed sequentially connected reaction zones in one end of said reactor, a liquid settling zone disposed in the opposite end of said reactor, and a baffle separating the last of said reaction zones from said settling zone and connecting a liquid-liquid coalescing zone disposed in the lower portion of said reactor with a vapor liquid-coalescer zone disposed in the upper portion of said reactor, said baffle adapted to prevent flow of vapors from said last reaction zone to said settling zone and return of liquid separated in said vapor-liquid coalescer zone to said liquid-liquid coalescing zone and said liquid-liquid coalescing zone adapted to convey liquid to said settling zone.

7. An alkylation vessel comprising in combination a reaction section containing a plurality of sequentially connected reaction zones in one end of said reactor for flow of liquid therethrough, a settling section in the opposite end of said vessel, means for conveying vaporous material from the upper portion of each of said reaction zones to the upper portion of the last of said reaction zones, a liquid-liquid coalescing zone disposed in the lower portion of said vessel separating said reaction section from said settling section and adapted to convey liquid therethrough, a vapor impervious baffle connecting said liquid-liquid coalescing zone with the upper portion of said vessel, a vapor-liquid coalescer zone disposed in the upper portion of said reaction section, means for removing vaporous material from said vapor-liquid coalescing zone and means for removing reaction product from said settling section.

8. A unitary apparatus comprising in combination an elongated horizontally disposed closed vessel having a reaction section containing a plurality of vertically disposed sequentially connected reaction chambers in one end of said vessel, a separation section in the opposite end of said vessel, a liquid-liquid coalescing device positioned in the lower portion of said vessel and separating said reaction section from said separation section, said liquid-liquid coalescing device formed by a substantially vertical liquid impervious baffle extending from the bottom of the vessel to the upper portion thereof and a spaced apart substantially vertical perforated baffle extending upwardly from the bottom of said vessel to the upper portion thereof, the space confined by said baffles being packed with an inert packing material to form said liquid-liquid coalescing device, a vapor impervious baffle separating said reaction section from said separation section extending from the top of said vessel downwardly into said packing, a horizontally disposed vapor-liquid coalescing device disposed in the upper portion of said vessel forming the lower portion of a confined zone therein, said confined zone being disposed on the reaction section side of said vapor impervious baffle, said vapor-liquid coalescing device formed by a plurality of layers of horizontally positioned screens, means for introducing reactant to each of said reaction chambers, means for removing vaporous material from said vapor-liquid coalescing zone and means for removing liquid products of reaction from said separation section.

9. In an alkylation zone separated into a reaction section and a settling section, the improvement for recovering an alkylate product substantially free of entrained acid and ester from said alkylation zone which comprises forming an emulsion of liquid acid catalyst and an isoparaffin, passing said emulsion through said reaction section in contact with an olefin reactant introduced at a plurality of points to said emulsion under temperature and pressure conditions to produce a liquid alkylate product containing acid and esters formed during said reaction, controlling said alkylation temperature conditions by vaporizing a portion of said reactants to produce a vaporous product containing hydrocarbon reactants, acid and esters, withdrawing said vaporous product from said reaction section and passing the same through a vapor coalescing zone to remove entrained acid and esters as a liquid from said vaporous hydrocarbon, recovering vaporous hydrocarbons substantially free of entrained acid and esters from said vapor coalescing zone, passing said liquid acid and esters removed by said vapor coalescing zone to said liquid alkylation product, passing said liquid alkylation product through a liquid coalescing zone under conditions to effect stratification of said liquid product in said settling section into a hydrocarbon alkylate product substantially free of entrained acid and esters and an acid layer containing said esters, and recovering said liquid hydrocarbon alkylate product from said settling section for further separation into a light alkylate and a heavy alkylate product.

10. A unitary closed vessel comprising in combination, a reaction chamber, a settling chamber, and a surge chamber, a liquid coalescing chamber separating said reaction chamber from said settling chamber and positioned in the lower portion of said vessel, a baffle separating said reaction chamber from said settling chamber extending from the top of said vessel downward into the upper portion of said liquid coalescing chamber, a vapor coalescing chamber positioned adjacent to said baffle and in the upper portion of said reaction chamber, inlet means to said reaction chamber, outlet means from said vapor coalescing chamber, outlet means from said settling chamber and outlet means from said surge chamber.

11. A unitary horizontally disposed alkylation vessel comprising in combination a reaction section containing a plurality of vertically and adjacently positioned reaction chambers positioned in one end of said vessel, baffle means for passing a liquid sequentially through said vertically and adjacently positioned reaction chambers, a separation section positioned in the opposite end of said vessel, a liquid coalescing device positioned in the lower portion of said vessel, said liquid coalescing device separating said reaction section from said separation section, a baffle separating said reaction section from said separation section extending from the upper portion of said vessel downwardly into the upper portion of said liquid coalescing device, a vapor coalescing chamber, means for passing vapors from said reaction section to said vapor coalescing chamber, means for passing liquid from said vapor coalescing chamber to said liquid coalescing device, inlet means connected to said reaction chambers, outlet means connected to said vapor coalescing chamber, and outlet means connected to said separation section.

References Cited in the file of this patent

UNITED STATES PATENTS

| | | |
|---|---|---|
| 2,521,785 | Goodloe | Sept. 12, 1950 |
| 2,527,392 | Bradshaw | Oct. 24, 1950 |
| 2,700,690 | Mottern | Jan. 25, 1955 |
| 2,760,850 | Lambert et al. | Aug. 28, 1956 |
| 2,768,987 | Hart | Oct. 30, 1956 |

OTHER REFERENCES

Stiles: Petroleum Refiner, vol. 34, No. 2, pp. 103–106 (February 1955).

Kellog: Petroleum Refiner, vol. 35, No. 4, p. 51 (April 1956).